United States Patent [19]

Verner et al.

[11] Patent Number: 5,127,495
[45] Date of Patent: Jul. 7, 1992

[54] PARKING BRAKE AND METHOD THEREFOR

[75] Inventors: Douglas R. Verner, Sterling Heights; Kenneth S. Towers, Royal Oak; William C. Eddy, West Bloomfield; Gary L. Casey, Troy, all of Mich.

[73] Assignee: Allied-Signal Inc., Morris Township, Morris County, N.J.

[21] Appl. No.: 589,739

[22] Filed: Sep. 28, 1990

[51] Int. Cl.⁵ .............................. F16D 65/14
[52] U.S. Cl. ............... 188/106 F; 188/106 A; 188/363
[58] Field of Search .......... 188/106 R, 106 F, 106 A, 188/106 P, 326, 325, 362, 363, 265, 353

[56] References Cited

U.S. PATENT DOCUMENTS

| | | | |
|---|---|---|---|
| 2,012,661 | 8/1935 | Frank | 188/353 |
| 3,093,213 | 6/1963 | Limoges et al. | 188/106 P |
| 3,525,423 | 8/1970 | Sheiry, Jr. | 188/106 F |
| 3,706,360 | 12/1972 | Nyunoya | 188/106 A X |
| 3,809,191 | 5/1974 | Woodward | 188/106 A |
| 3,814,484 | 6/1974 | Matthews | 303/3 |
| 4,637,664 | 1/1987 | Arikawa | 303/111 |
| 4,674,804 | 6/1987 | Burgdorf et al. | 303/6 |
| 4,795,219 | 1/1989 | Brearley et al. | 303/22.1 |
| 4,805,105 | 2/1989 | Weiss et al. | 303/DIG. 3 |
| 4,852,008 | 7/1989 | Sager | 303/105 |
| 5,029,681 | 7/1991 | Swiatek | 74/531 X |

*Primary Examiner*—Robert J. Oberleitner
*Assistant Examiner*—Lee W. Young

[57] ABSTRACT

A parking brake system comprising a drum brake (200) comprising two shoes (206) outwardly movable relative to a friction surface of a drum (224); an activation device (220, 222) for generating an activation force to move the shoes outwardly to a first position into contact with the drum sufficiently to prevent the drum; a solenoid activated linkage mechanism (230, 240; 322, 352) is provided for maintaining the shoes substantially in the first position.

14 Claims, 5 Drawing Sheets

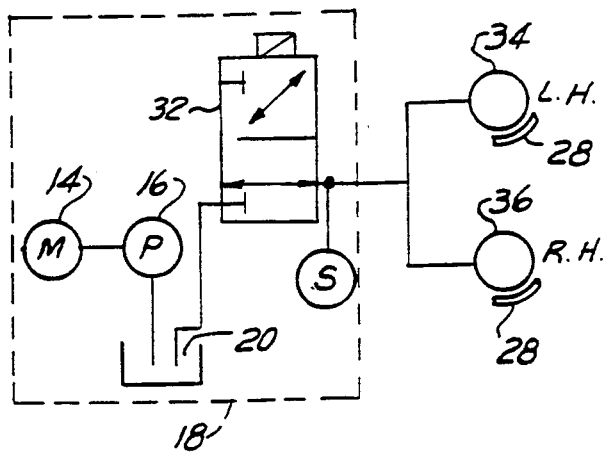
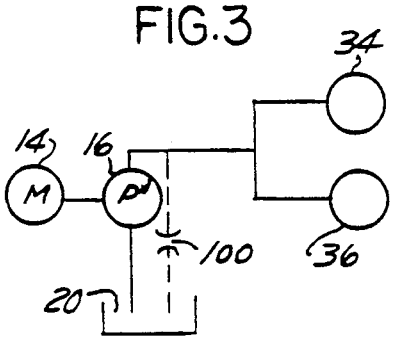
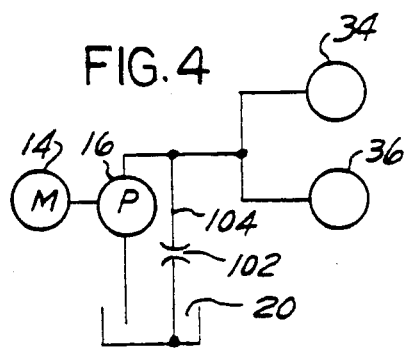
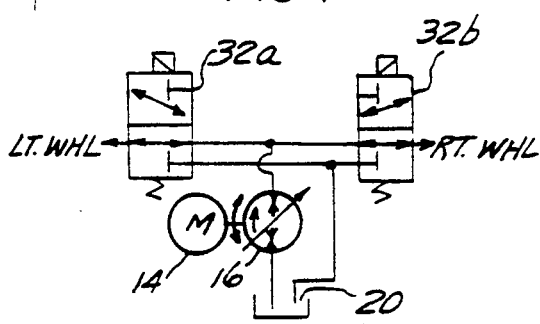
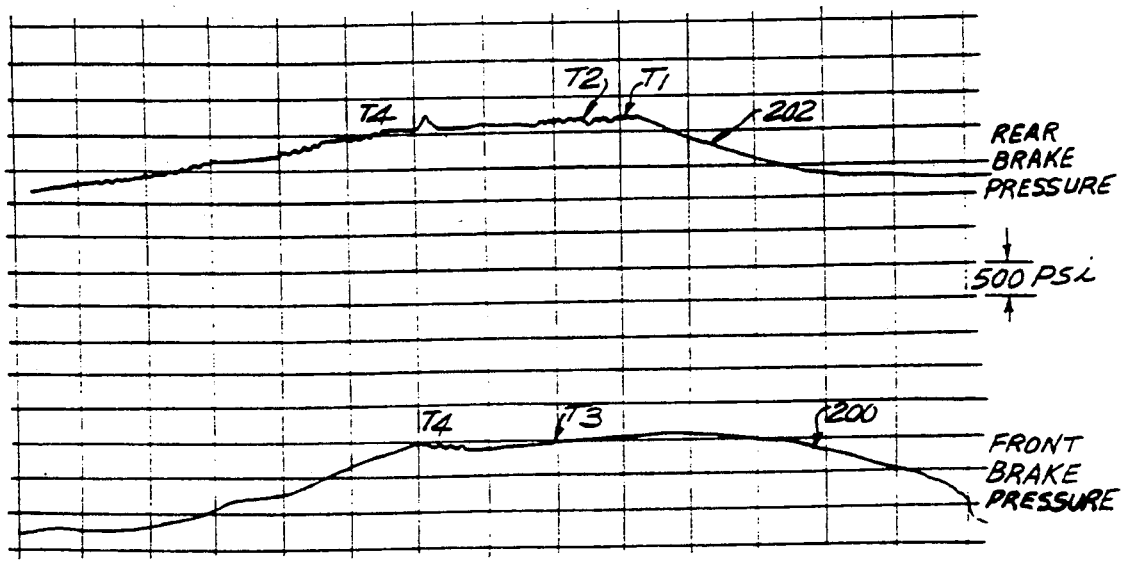

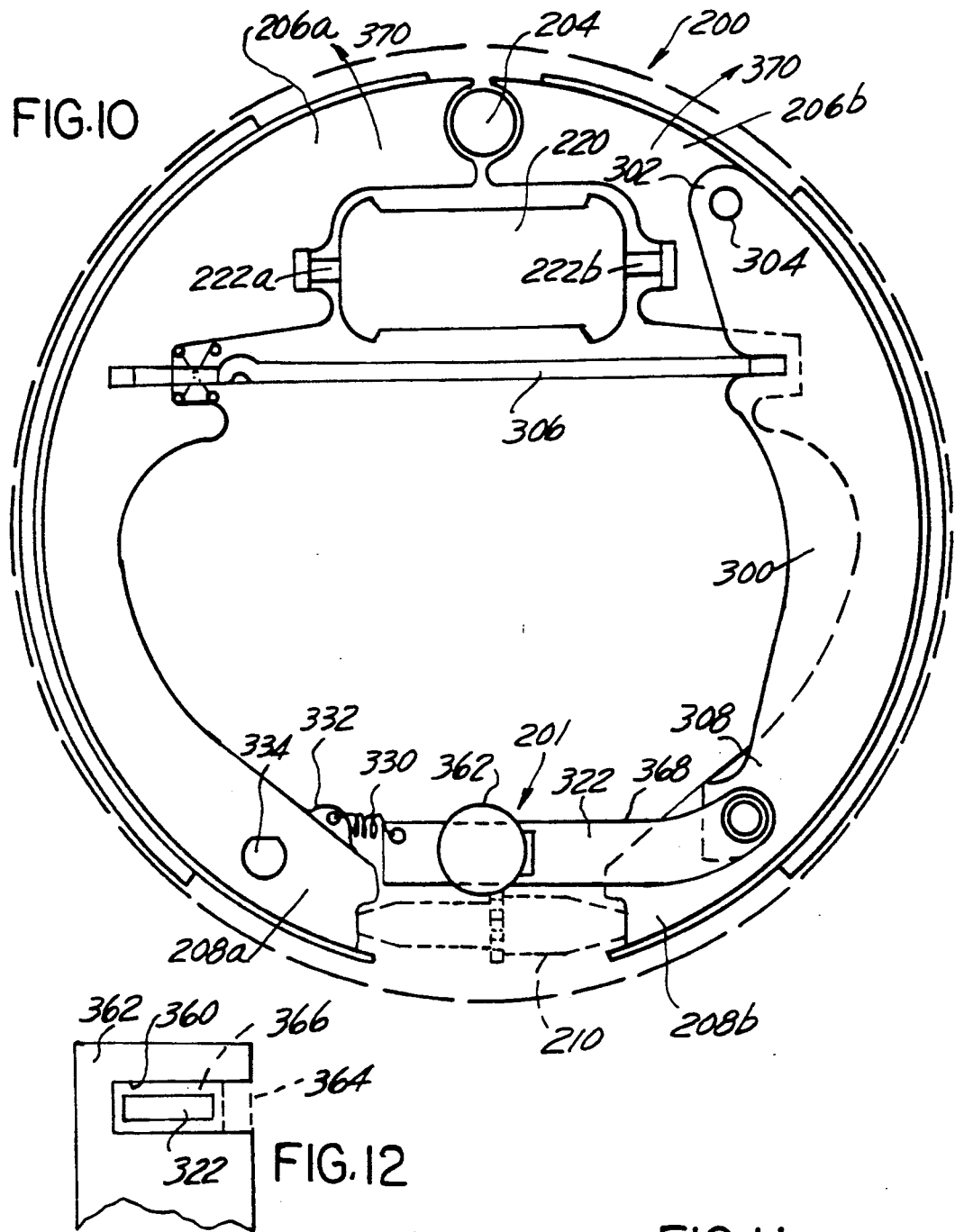

PARKING BRAKE AND METHOD THEREFOR

BACKGROUND AND SUMMARY OF THE INVENTION

The present invention relates to an electrically powered, pressure or pedal effort referenced single axle braking system and more particularly to an electrically powered parking brake for such a system.

It is an object of the present invention to provide a parking brake usable within an electrically referenced braking system.

Accordingly the invention comprises a parking brake system comprising a drum brake comprising two shoes outwardly movable relative to a friction surface of a drum; an activation device for generating an activation force to move the shoes outwardly to a first position into contact with the drum sufficiently to prevent the drum and an associated wheel from rotating and first means for maintaining the shoes substantially in the first position. In one embodiment of the invention a solenoid activated linkage mechanism is provided to establish a positive connection between the brake shoes. In another embodiment of the invention another solenoid activated linkage mechanism is provided between one of the shoes and a parking brake lever attached to the other shoe.

Many other objects and purposes of the invention will be clear from the following detailed description of the drawings.

BRIEF DESCRIPTION OF THE DRAWINGS

In the drawings:

FIG. 2 is a schematic diagram showing many of the components of the brake system.

FIGS. 3 and 4 illustrate alternate embodiments of the system.

FIG. 6 illustrates various brake pressure time traces.

FIG. 7 illustrates a further embodiment of the brake system.

FIGS. 10 and 11 illustrate an alternate embodiment of a parking brake.

FIG. 12 illustrates a cross-sectional view of a portion of a solenoid housing

DETAILED DESCRIPTION OF THE DRAWINGS

Figure 1:
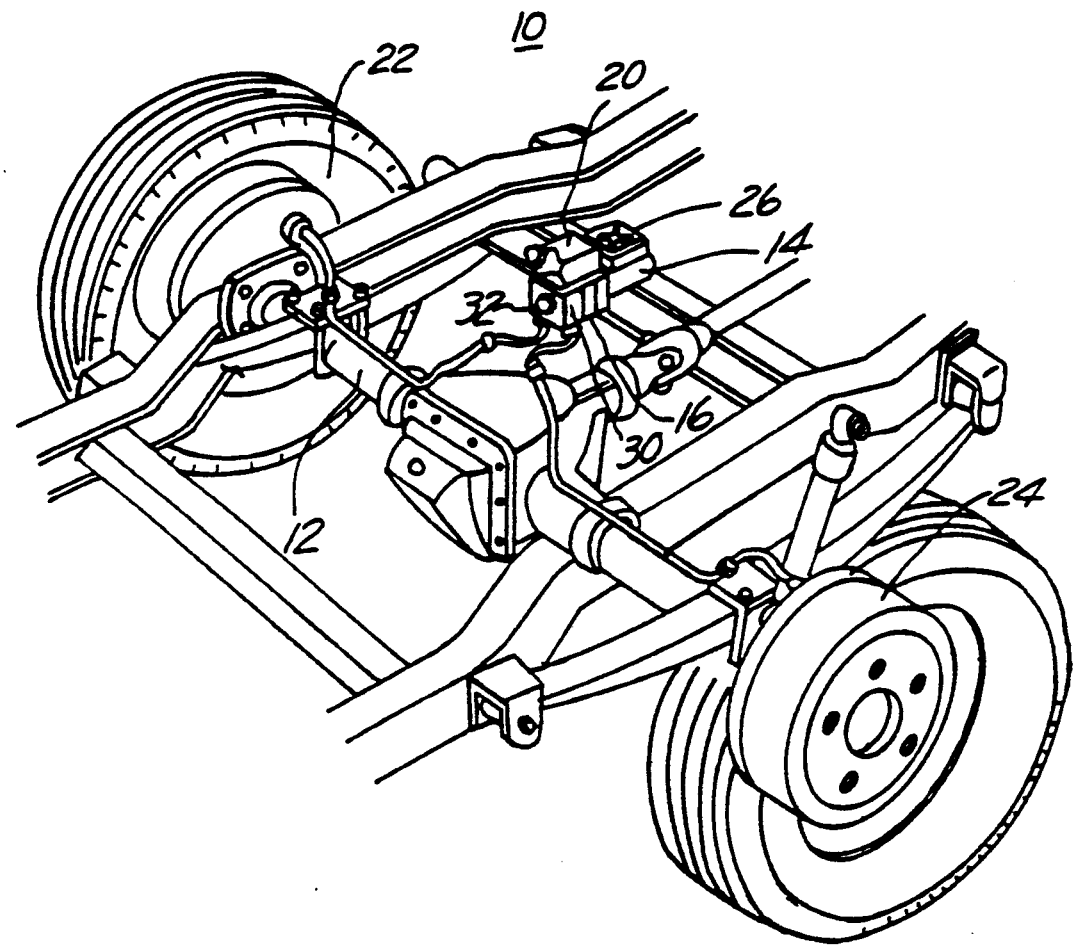
FIG. 1 illustrates an electrically powered brake system.

In the following description, FIGS. 1 through 7 illustrate an electrically powered, pressure or pedal effort referenced braking system. In the preferred embodiments shown in FIGS. 8 through 10 the braking system is used to achieve an electrically powered parking brake. FIG. 1 illustrates the major components of an electrically powered braking system 10. As shown, the braking system 10 has been included within the rear axle 12 of a truck. The braking system 10 includes a motor 14 powering a pump 16 positioned in a housing 18. Situated above the housing 18 is a fluid reservoir 20. The output of the pump is communicated to the respective brake cylinders (34, 36) in the left hand 22 and right hand 24 vehicle brakes/wheels through an outlet plate 30 of the housing 18 which supports an optional solenoid valve 32. An electronic control unit 26 may be mounted atop the motor 14 to provide for a compact package.

FIG. 2 schematically illustrates the above described components showing their placement within the housing 18. During normal operation of the pump 16, it is communicated through the optional solenoid 32 directly to left hand and right hand brake cylinders 34 and 36. Upon activation of the solenoid 32, brake fluid within these cylinders is permitted to flow back to the reservoir 20 to relieve brake pressure. A rear pressure transducer such as sensor 38 is provided to sense the ear brake pressure.

The alternate embodiment shown in FIG. 3 includes a pump 16 feeding the brake cylinders directly. Brake pressure application is accomplished by activating the pump 16 upon halting the pump, as described below, the pressurized brake fluid is permitted to drain to the reservoir 20 throught leak passages in the pump which are illustrated by the orifice 100. The embodiment of FIG. 4 is similar to that shown in FIG. 3 with the exception that a discrete orifice 102 is connected, in line 104, between the brake cylinders 34, 36 and the reservoir. It should be appreciated that the flow rate of the pump 16 used in the embodiments of FIGS. 3 or 4 will be larger than that used in FIG. 2 (assuming that a non-leaky or "tight" pump is used) since the pump must be able to pressurized the brake cylinders in view of the flow returned to the reservoir through internal leakage or the orifice 102.

Figure 5:
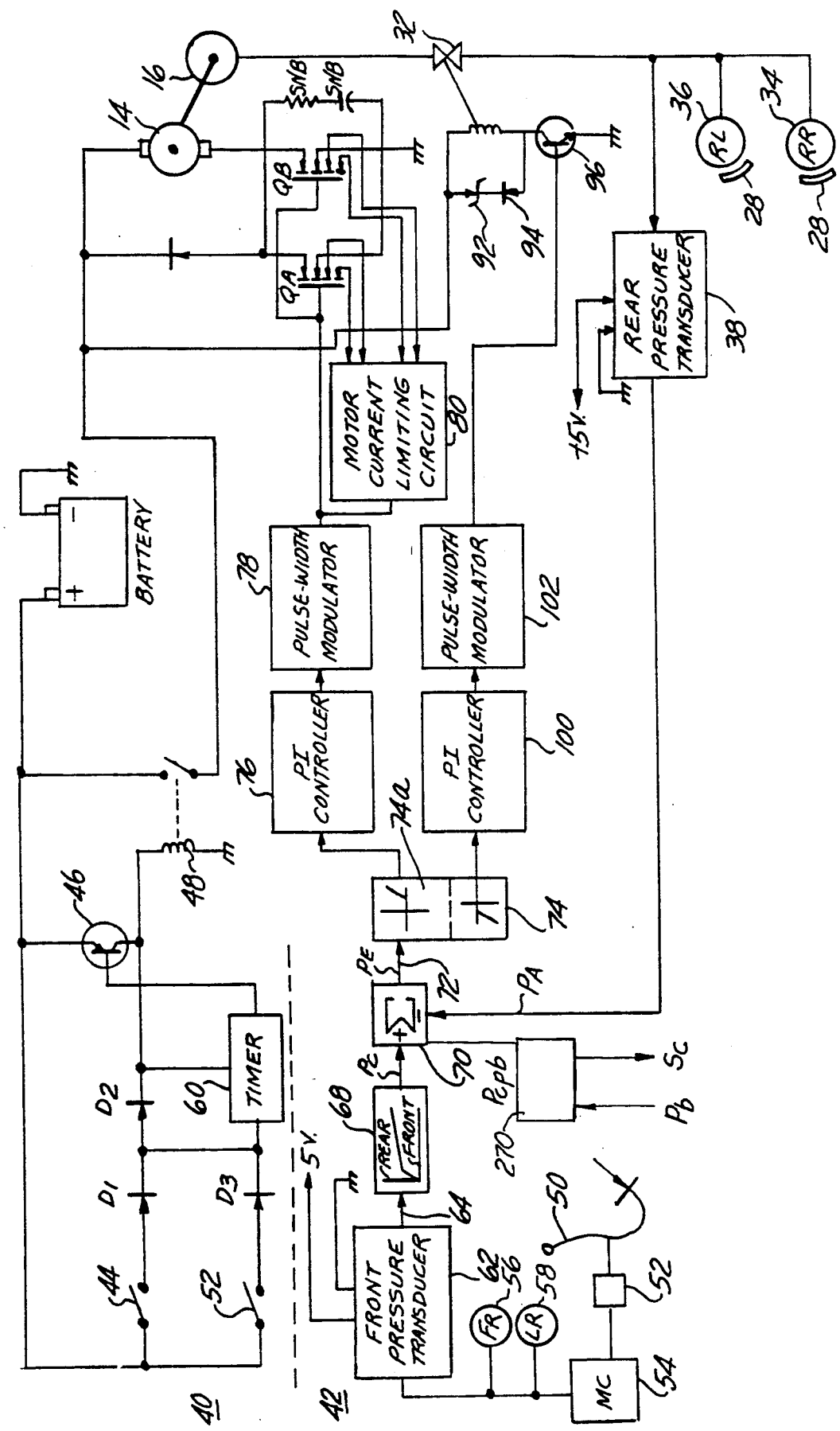
FIG. 5 illustrates an electric control unit usable in the brake system.

FIG. 5 illustrates the electronic control unit 26 used to control the operation of the motor 14 and pump 16. It also contains circuitry for controlling the solenoid 32, if used. The electric control unit 26 includes a power supply circuit 40 and a control circuit 42. The purpose of the power supply circuit is to apply battery or alternator supply voltage to the motor 14 and to various portions of the control circuit 42. Upon closure of the ignition switch 44 or alternatively application of the pedal 50, i.e., closure of a brake switch 5 a switching transistor 46 is enabled which activated a voltage supply switch 48 to communicate battery or alternator voltage to the motor 14 and to the control circuit. As will be seen from the description below, the brake system 10 is electrically powered and as such, the supply which maintains supply voltage to the motor 14 and control circuit 42 for a predetermined time (0.5 to 5 seconds) after the brake pedal is released. This time delay avoids premature turning off of the motor due to bounce of the brake switch 52 and also prohibits the supply voltage from being abruptly turned on and off, thereby energizing the control circuit and motor 14, such as when the operator taps on the brake pedal when the vehicle is parked.

As shown, the front brakes of the vehicle are hydraulic, but can also be electrically powered. Upon application of the brake pedal, the master cylinder 54 applies brake pressure to the front right 56 and front left 58 brake cylinders. It should be appreciated that the system 10 is hydraulically isolated from the front brakes. A front brake pressure command signal $P_C$ (also see numeral 60) is obtained by measuring master cylinder pressure or the applied front brake pressure with a transducer 62. Instead of sensing pressure, a pedal effort force transducer can be used. The output of this transducer 62 is communicated to a proportioning circuit 66, the output of which forms the commanded rear brake pressure signal. As it is known in the art, conventional proportioning valves have a nonlinear characteristic. This nonlinear characteristic can be approximated electronically by a look-up table, a piece-wise linear curve fit or other technique as is known in the art. A summing circuit 70 compares the commanded brake pressure signal with the pressure in the rear brake line PA as sensed by the rear brake pressure transducer 38 forming an error signal PE (also see numeral 72). The error signal is communicated to a sign sensitive dead-band circuit 74 of known construction. The dead-band region in the circuit 74 (74a) is used to minimize noise propogation throughout the control circuit 42. As shown schematically, if the commanded brake pressure signal $P_C$ is greater than the rear brake pressure $P_A$, a positive error signal is generated, shown by block 72, which is communicated to a proportional plus integral motor controller 76, the output of which is received by a constant frequency variable pulse width modulator 78. The output of the modulator 78 is fed to a conventional arrangement of motor power transistors QA and QB. These power transistors QA and QB are of the sense-fet variety which include a current monitoring lead which is connected to a motor current limiting circuit 80 of known variety. The output of the pulse width modulator 78 represents the command input to the motor 14. This output signal comprises a plurality of pulses having a constant frequency such as 25 KHz and a varying pulse width proportional to the error signal $P_E$. If for some reason, such as during motor start up, the binding of the pump 16, hydraulic load, etc., the current in the motor, as sensed by the motor current limiting circuit 80, exceeds a preset value, the output of the motor current limiting circuit 80 clamps the output of the pulse width modulator 78 to ground, thereby reducing the effective motor commanded signal, i.e., pulse width to the motor. This technique is one known in the art and not described in detail herein. It should be appreciated that during the first phase of braking, the pump 16 operates in its normal pumping mode moving fluid to the brake cylinders 34, 36. After the brake pressure achieves its commanded valve, the pump operates somewhat as a rotary solonoid, that is, with the brake line fully pressurized only a modest rotation of the pump 16 contributes to additional braking force. During this phase of operation it is expected that pump rotation will be proportional to commanded motor current. As can be appreciated, in some regard the motor/pump combination operates as an electric master cylinder. As an example, a conventional hydraulic master cylinder pumps a relatively large amount of fluid to initiate braking. After the brake line has been pressurized, relatively small displacements in the master cylinder contribute directly to increased brake forces.

Supply voltage is also communicated from the supply circuit 40 to the coil 90 of the solenoid valve 32. A Zener diode 92 and diode 94 are connected across the coil 90 in a conventional manner to speed up the current decay in the coil on turn-off. Absent a signal supplied to the solenoid drive transistor 96, the valve 32 will remain in a condition as shown in FIG. 2 communicating the pump 16 to the rear brake lines and rear brake cylinders 34 and 36. If during the operation of the system 10, the rear brake pressure achieves a value greater than the commanded brake pressure, the error signal $P_E$ is negative. This negative error signal $P_E$ is communicated using the negative going portion of the dead-band circuit 74 (74b) to a second proportional plus integral controller 100 which is communicated to another constant frequency variable pulse width modulator 102 which varies the on time of the solenoid drive transistor 76 so that this on time is proportional to the magnitude of the error signal. The frequency of the pulse width modulator 102 should be compatible with the valve 32. A constant frequency of 100 cycles has been chosen for the second pulse width modulator 102. It should be appreciated that if the embodiments of FIGS. 3 and 4 are employed, the solonoid control circuitry is not used.

The operation of the system 10 is as follows. Upon application of the brake pedal 50 by the operator, the front brake pressure 200, as shown in the time traces of FIG. 4, will increase These time traces are representative of actual test data. As mentioned, pedal effort can be measured as an alternative to measuring master cylinder or front brake pressure as by using transducer 62. The output of the electric proportioning control circuit 68, defines the commanded rear axle brake pressure signal. In the system which generated the curves shown in FIG. 6, such proportioning circuit or control 68 had a front to rear proportioning of 60:40. Upon the initial application of the brake pedal, a large magnitude positive error signal $P_E$ is generated causing the controller 76 and modulator 78 to cause transistors QA and QB to turn on during the duration of each positive pulse generated by the modulator 78. With the power transistors QA and QB turned on, the motor 14 causes pump 16 to supply pressurized brake fluid from the reservoir 20 to the rear brakes 34 and 36. The operation of the pump increases rear brake pressure 202 (see FIG. 6) such that at or about a time T1 the rear brake pressure has achieved a substantial steady state value as established by the electric proportioning circuit 68. The control circuit 42 will attempt to match the actual rear brake pressure $P_A$ with the commanded rear brake pressure $P_C$. During the regulation of the rear brake pressure, the actual rear brake pressure may exceed the commanded brake pressure. In this situation the now negative going error signal $P_E$ is communicated to the controller 100 and the second pulse width modulator 102 to activate the solenoid drive transistor 96, thereby causing the valve 32 to change state and communicate the rear brake cylinders 34 and 36 to the reservoir, thereby reducing rear brake pressure. In the embodiments of FIGS. 3 and 4 which do not employ a solenoid to relieve pressure, any momentary overpressurization will be reduced by virtue of leakage flow or flow through the discrete orifice 102.

Returning to the discussion of the system of FIG. 6, the various oscillations in the rear brake pressure time trace of FIG. 6, such as at time T2, are indicative of the fact that the actual rear brake pressure had exceeded the magnitude of the commanded rear brake pressure and as such the valve 32 was commanded under the influence of the proportional plus integral controller 100 and pulse width modulator 102, to periodically return rear brake fluid to the reservoir 120. During the time that the error signal $P_E$ is communicated to the controller 100 and pulse width modulator 102, the error signal is removed from the motor controller 76 and modulator 78. As such, the motor 14 and pump 16 will tend to slow down. Due to the inertia of the motor 14 and pump 16, this slowing does not occur instantaneously and as such, the motor/pump combination continues to generate additional though diminishing pressure During the operation of the control circuit 42 when the error signal $P_E$ is once again positive, such signal is communicated to the motor 14 for continued brake pressure build. Reference is again made to the time traces in FIG. 6. At time T3 the operator of the vehicle slightly reduced the applied brake force, which is accompanied by a reduction in both front and rear brake pressure. As the vehicle approached a full stop condition, the operator continued to relieve the applied brake force at time such as T4. Subsequent to time T4, that is, as the operator further reduces brake pedal effort as the vehicle is approaching a stop, rear brake pressure closely tracks the front brake pressure. The oscillations in the rear brake pressure show the periodic activation of the valve 32 wherein rear brake pressure is further relieved.

While the above discussion has described one cycle of normal braking action, it should be apparent that the present invention as shown is FIG. 2 is readily usable in an adaptive braking/antiskid mode of operation. That is, if during the above described braking cycle the wheels 22, 24 begin to skid, as sensed by adaptive control electronics and wheel sensors 28 of known variety, the pump 16 command signal is reduced or set to zero, the solenoid 32 is opened thereby diminishing brake pressure, on a per-axle basis until the wheel has stopped skidding. Thereafter brake pressure, i.e. pressure command signal can be increased (build) and/or held constant under control of the antiskid/adaptive braking control electronics. While the solenoid 32 yields a means to precisely and controllably reduce brake pressure, such reduction during antiskid operation, can be achieved by use of the embodiments of FIGS. 3 and 4. As previously described, reductions in brake pressure are accomplished by permitting fluid to return to the reservoir 20 through pump leakage 100 or a discrete orifice 102. As such, if a wheel skid or impeding skid condition is sensed the commanded brake pressure is reduced. Thereafter the pressurized brake fluid in the cylinders will rapidly dump to the reservoir 20, permitting the wheel to come out of its skid condition. Thereafter the commanded pressure is again increased, held constant, etc., under control of the antiskid electronics.

The advantages of the above described system can be enhanced by adding a second control valve 32b (see FIG. 7). The control valves 32a and 32b can be operated simultaneously to relieve brake pressure during normal braking in the manner that the single control valve 32 is operated. However, by virtue of the use of two control valves each wheel 22, 24 can be independently controlled during antiskid and/or adaptive traction modes of operation. It should be apparent that in this configuration individual control valve circuits 100, 102 would be employed to operate the respective control valves 32a or b.

Figure 8:
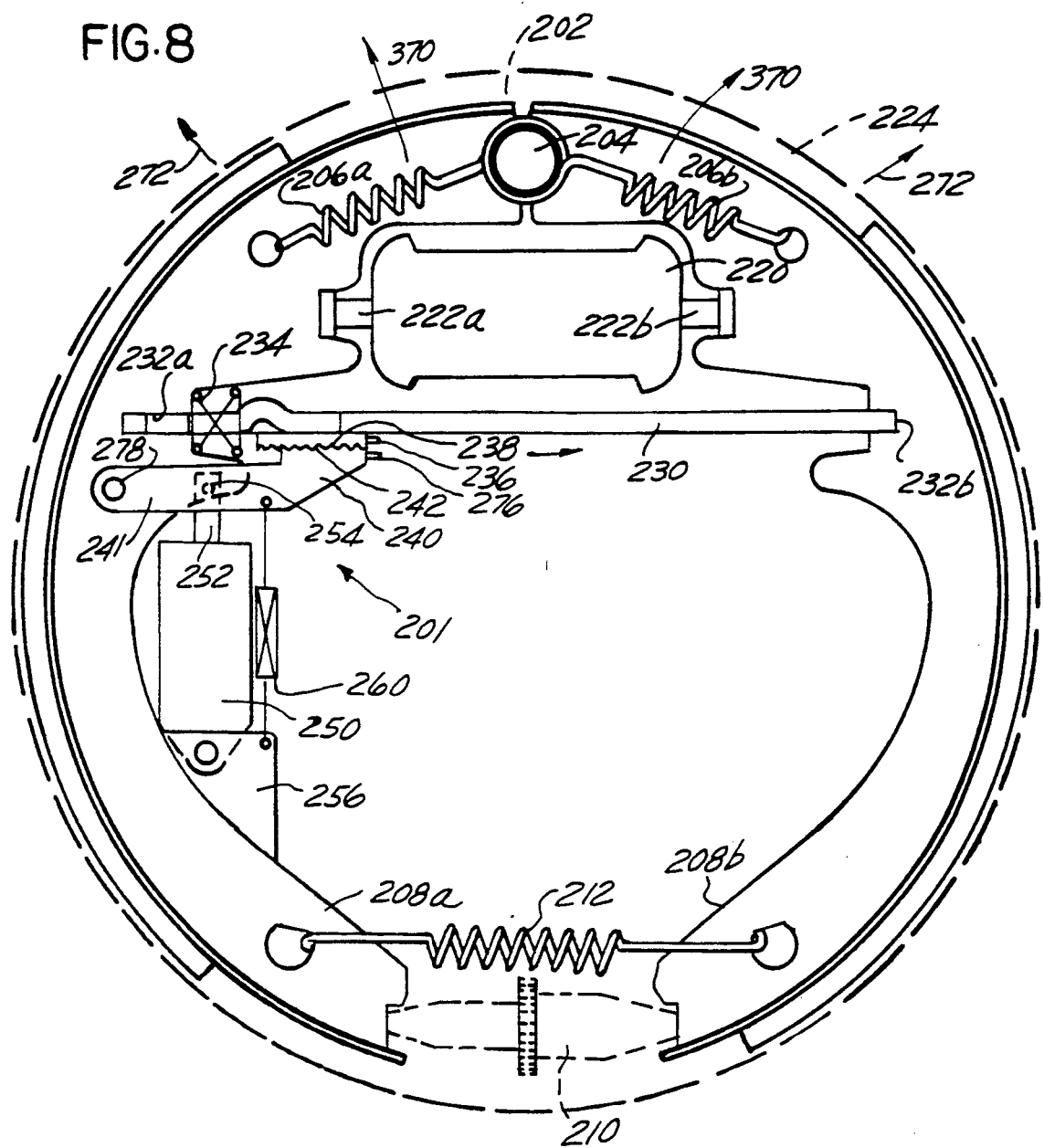
FIG. 8 illustrates one embodiment of a parking brake incorporated within a drum brake.

Reference is made to FIG. 8 which illustrates a side plan view of a drum brake 200 of generally known construction incorporating a parking brake mechanism 201. Typically, drum brake such as 200 includes a backing plate 202 which carries an anchor pin 204. A pair of brake shoes such as 206a and 206b are mounted to the backing plate 202 about the pin 204. The ends 208 of the brake shoes 206 opposite the pin 204 are often joined by an adjusting screw mechanism generally shown as 210. Typically a spring such as 212 may be used to bias the brake shoes together. Interconnecting the upper portion of the brake shoes 206a and 206b is an activation device such as wheel cylinder 220. It should be appreciated that the activation device can be electrical, hydraulic or pneumatic. In the preferred embodiment, a hydraulic wheel cylinder is shown. This wheel cylinder 220 had been schematically shown in FIGS. 2 through 4 by numerals 34 and 36. Extending from the wheel cylinder 220 are push rods 222a and 222b which urge the brake shoes outwardly against a friction surface of a brake drum 224 shown in phantom line. Also linking the brake shoes 206a and 206b is a parking brake link 230 coupled to a slots 232a and 232b formed within the shoes 206. The parking brake link 230 is loosely received within the slots or cutout 232 and biased by a spring 234 into one of the brake shoes such as 206b. Extending downwardly from the parking brake link is a first engagement member 236 having locking formations 238 thereon. As illustrated in FIG. 8, these locking formations comprise a first set of teeth. Pivotably connected to brake shoe 206a is a second engagement member shown as 240 comprising a link 241 having a complementary set of locking formations 242 which as shown comprise another set of teeth. The teeth 238 and 242 as shown have a saw tooth design. A solenoid 250 having an armature or plunger element 252 is pivotally attached at 254 to the second engagement member 240. The other end of the solenoid is fixed to a non-moving part of the brake assembly 200 such as by attaching same to a portion 256 of the backing plate 202. A return spring 260 is schematically shown connecting the second engagement member 240 to the backing plate portion 256. The return spring can be internal to the solenoid 250.

The operation of the parking brake 201 shown in FIG. 8 is discussed below. With the vehicle at rest the motor 14 (see FIG. 5) is actuated to cause the pump 16 to build pressure within the brake cylinder 220 causing the brake shoes to expand sufficiently forcefully to prevent rotation of the brake drum 224 and an associated wheel/tire attached thereto. As an example, if automatic parking brake operation is desired, the vehicle may be equipped with a parking brake button or switch designated as $P_b$ and shown in FIG. 5. Upon activation of the parking brake switch $P_b$ by the vehicle operator, such switch signal may be received by a sequencing and scaling circuit 270 of the electronic control unit 26 which will generate a parking brake command control pressure signal shown as $P_{cpb}$ which is received by the summing circuit 70. This parking brake control pressure signal may be scaled to approximately 1,000 to 1,500 psi. Upon receipt of the parking brake control pressure signal, the electronic circuitry shown in FIG. 5 will activate the motor 14 and pump 16 to generate a brake line pressure equal to this value. As the brake line pressure builds, the brake cylinder 220 moves the rods 222 outwardly causing the brake shoes 206 to move or pivot outwardly relative to the adjusting mechanism 210 into contact with the drum 224 as shown by arrows 272. The displacement of the shoes 206a and 206b relative to one another will cause the parking brake link 230 to effectively move to the right as seen in FIG. 8 under the bias of the spring 234.

After the brake pressure has achieved a value substantially equal to the command brake pressure, as sensed by the rear pressure transducer 38, a solenoid command signal $S_c$ (see FIG. 5) is generated to activate the solenoid 250. Upon activation of the solenoid 250 the plunger 252 is moved upwardly thereby causing the rotation of the second engagement member 240 or link 241 to move into contacting engagement with the first engagement member 236.

Figure 9:
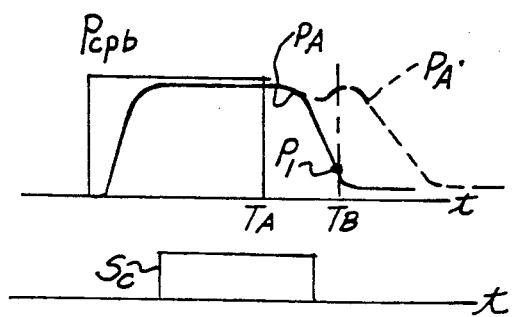
FIG. 9 illustrates various time traces.

The sequencing of the parking brake command control signal $P_{cpb}$ and the solenoid control signal $S_c$ are shown in FIG. 9. At some time such as $T_a$, the sequencing circuit 270 or ECU 26 reduces the commanded pressure such as to zero. Subsequently, the actual brake pressure $P_a$ reduces toward zero as the fluid flows through the valve 32, pump 76 or fixed orifice 102 as shown respectively in FIGS. 2, 3 and 4. The actual pressure curve $P_a$ in build and in decay is also shown in FIG. 9. As the actual brake pressure decays, the brake shoes 206a and 206b will move together as the brake shoes relax causing the parking brake link 230 to effectively move to the left (as seen in FIG. 8) thereby causing a ratcheting and the positive engagement of the locking formations or teeth 238 formed on the parking brake link 230 with the complementary locking formations or teeth 242 formed on the pivoted link or second engagement member 240 thereby establishing a physical connection between the first and second brake shoes 206a and 206b. In this condition the brake shoes 206a and 206b remain in positive contact with the drum 224 at a level which will prevent wheel rotation thereby achieving the parking brake function. Subsequent to lock up of the teeth 238 and 242 the solenoid control signal $S_c$ is removed which permits the solenoid 250 and more particularly the plunger 252 to float relative to the link 241. The links 241 will remain in the position as shown in FIG. 8 due to the reactive forces generated at the tooth interfaces.

The mechanism for disabling the above-described parking brake is as follows: In response to the next activation by the operator of the parking brake switch $P_b$, the motor 14 and pump 16 are again activated to repressurize the wheel cylinder 220 thereby causing the shoes 206a and 206b to move a minute amount apart, thereby causing the parking brake link 230 to once again move. This movement causes the relative motion between the teeth 238 and 242 causing a disconnection therebetween whereupon the link 240 disengages from the member 236 under action of the bias spring 260 and gravity.

The above described sequencing of the parking brake has been performed with minimum involvement of the operator save his pressing the switch $P_b$. The following describes a procedure in which the operator has a greater involvement. To initiate the parking brake function the operator would depress the brake pedal to generate a pressure of about 1,000 to 1,500 psi. In this case the manual activation of the brake pedal activates the motor 14 and pump 16. Subsequently, the ECU 26, upon monitoring brake level pressure would cause a light or other indicator to be activated, thereby indicating to the operator that brake pressure has been achieved and by inference that the brake shoes have moved outwardly. In response to this indication, and with the pedal depressed, the operator would depress the switch $P_b$ to initiate solenoid 250 operation locking the shoes in place. To release the paring brake the operator is again substituted for the above described automatic, computer controlled operation. In this case the operator need only once again step forcefully on the brake pedal, thereby activating the motor and pump, causing the shoes 206a and 206b to move a minute amount apart which also causes the parking brake link 230 to once again move. As described above, this action will disengage the link 240 from the member 236 thereby terminating the parking brake function.

The operation of the above described parking brake mechanism presupposes the physical meshing of the teeth 238 and 242 prior to removal of the solenoid control signal which caused the link 241 to move upwardly. If however, the meshing of the teeth does not occur then the line 240, after the removal of the solenoid control signal, the link 240 will be biased away from the teeth 238 due to the absence of the reaction force between the various sets of teeth. If locking of the teeth does not occur then the above-described parking brake function is not achieved.

The positive engagement of the sets of teeth 238 and 242 after the reduction in brake line pressure can be monitored by incorporating a sensor such as 276 which may include a contacting microswitch which would generate a signal of closure of associated contacts. Subsequent to the reduction in brake line pressure and the desired locking of the teeth 238 and 242, the switch 276 would be interrogated. If locking engagement, as designated by switch closure is not present, pressure is reapplied to the wheel cylinder 220 repeating the above engagement process. It should be appreciated that the closure or engagement between the teeth 238 and 242 may be sensed by a rotational sensor located at the pivot point 278 of the link 240 or alternatively by sensing the continued outward displacement of the solenoid plunger 252. It should be recalled, as mentioned above, that if engagement is not achieved the bias spring 260 will cause the link 240 to move downwardly. Such downward motion may be sensed by the angular motion sensor or solenoid plunger sensing mechanisms.

The following presents an alternate methodology for sensing engagement between the parking brake link 230 and link 240. As mentioned above, the parking brake is initially set by pressurizing the wheel cylinder 220 causing the parking brake link 230 to move whereupon the link 240 is moved into contact or partial engagement with the locking formations or teeth 238. The pressure in the wheel cylinder 220 is reduced to zero whereupon the shoes move inwardly slightly causing the racheting of the teeth and physical locking of the parking brake link 230 and link 240. At this point in time relative motion between the shoes 206a and 206b ceases. In addition, there is no longer any inward motion of the wheel cylinder pistons 222a and 222b. After the locking engagement between the links 230 and 240 the pressure in the wheel cylinder 220 will decay exponentially through the various orifices provided in the system, such decay being shown in FIG. 9. If for whatever reason, a locking engagement of the parking brake link 230 and link 240 is not accomplished, then during the subsequent reduction of the pressure it can be seen that the time history of pressure decay within the wheel cylinder 220 or brake lines (see $P_{A'}$) will have a differing characteristic time history compared to the normal pressure decay $P_A$ achieved during lock up of the links 230 and 240. More specifically, when lock up does not occur, upon removal of the parking brake command signal at time $T_A$ the shoes 206a and b will move inwardly to their non-braked equilibrium condition. As the shoes move inwardly they force the respective rods 222a and 222b into the wheel cylinder 220 thereby acting as a pump pushing the fluid out from the wheel cylinder 220. The resulting pumping action of the fluid out from the wheel cylinder 220 sustains the brake line pressure for an extended period of time as compared to the pressure decay achieved upon locking engagement of the links 230 and 240.

It should be appreciated and as mentioned above, if the links 230 and 240 achieve the desired positive engagement or locking, the decay in wheel cylinder or brake line pressure is expondnential flow through the system orifices. In this situation the rods 222 are prevented from pumping additional fluid from the wheel cylinder 220.

It is known that pressure through an orifice such as achieved by time trace $P_A$ can be calculated rather exactly. In view of the above, it is contemplated that the system will monitor actual brake line pressure at a time $t=TB-TA$. If the actual pressure is greater than the calculated pressure P1 at this time such condition is indicative of the non-engagement of the parking brake link 230 with the link 240. As mentioned above, in a non-engagement condition pressure in the wheel cylinder is sustained due to the pumping action of the rods 222 and pistons associated therewith. If the above non-locking condition is achieved, parking brake engagement procedure is restarted.

Reference is now made to FIGS. 10 and 11 which illustrate an alternate embodiment of a drum brake 200 incorporating a parking brake mechanism 201. The drum brake 200 shown in FIG. 10 contains many elements similar to that shown in FIG. 8 which are identified by like numerals. As can be appreciated by one skilled in the art FIG. 10 comprises a typical rear drum brake having a backing plate 202, shoes 206a and 206b, a wheel cylinder 220, having pistons and rods 222 engaging respective shoes 206. A parking brake lever 300 is rotatably secured at one end 302 thereof by a pin 304 to brake shoe 206b. A parking brake link 306 joins the parking brake lever 300 to the other shoe 206a. As is known in the art, the other end 308 of the parking brake lever is often attached to a parking brake cable. Upon tensioning of the cable the end 308 is moved to the right thereby urging the shoes 206a and 206b outwardly into engagement with a corresponding drum 224 locking same in place. In the present embodiment of the invention, the parking brake cable has been removed and replaced with an engagement mechanism generally shown as 320. The engagement mechanism comprises an activation bar 322 joined at one end 324 thereof to the lower end 308 of the parking brake lever 300. The other end 326 of the activation bar 322 is spring loaded by a compression spring 330 to a portion of the backing plate generally shown as 332. It should be appreciated that the spring 330 could be attached to the brake shoe 206a. Such attachment could be accomplished by securing the spring 320 to the hole 334 used to receive a spring such as 212 shown in FIG. 8 which has been removed from FIG. 10 for clarity. The spring 330 could also be attached to the end of spring 312 which extends through the shoe 206a. The activation bar 322 includes locking formations 340 which may comprise a plurality of saw tooth like teeth. Secured within another portion 350 of the backing plate 202 and positioned below the plane of the activation bar 322 is a solenoid 352 having an armature 353 and a movable plunger element 354 containing complementary locking formations 356 such as another set of saw tooth like teeth. The plunger 354 is axially movable within a portion of the solenoid housing 358 which acts as a thrust bearing against the portion 350 of the backing plate 202. A wave spring 359 biases the plunger 354 into the solenoid housing 358. The solenoid housing 358 extends above the plane of the activation bar 322 and includes a cut-out 362 through which the activation bar is received. The top 362 of the solenoid housing acts as a stop to prevent the outward movement of the activation bar 322. The cut-out 360 can also be formed as a slot 366 (see FIG. 12 wherein a side wall portion 364 of the housing 358 is not cut away). The slot 366 may be closely spaced relative to the sides 368 of the activation bar to prevent skewing of same as the activation bar is moved by the Parking brake lever 300.

In order to achieve parking brake function within the above-described drum brake 200, pressure within the wheel cylinder 220 is increased thereby urging the brake shoes outwardly as shown by arrows 370. Outward movement of brake shoe 206b causes the outward movement of the pivot 304. This motion of the pivot 304 causes the lower end 308 of the parking brake lever to move inwardly as shown by arrow 372. The inward motion of end 308 of the parking brake lever 300 causes the activation bar 322 to move to the left as shown in FIG. 11. Thereafter, in response to a solenoid control signal such as $S_c$ (as discussed above) the plunger 354 of the solenoid 352 is raised into contact with the locking formations or teeth 340 formed on the lower face of the activation bar 322. With the plunger held in place because of the continued presence of the solenoid activation signal, the pressure within the wheel cylinder 220 is reduced thereby causing a slight inward movement of the brake shoes 206, which in turn causes the activation bar 322 and parking brake lever 300 to move slightly to the right (as seen in FIG. 11) thereby causing engagement of the locking formations or teeth 356 formed on the plunger 354. Upon engagement of the teeth 340 and 356 the connected therewith are maintained in engagement with the drum 220 in a manner to prevent rotation of the drum and associated wheel. In this situation a physical link is obtained between the parking brake lever 300 and the backing plate by the engagement of the plunger 354 which is urged against the solenoid housing/thrust bearing 358 which in turn is connected to the portion 350 of the backing plate. Any outward motions of the activation bar 322 are prevented due to the close spacing with the top portion 362 of the solenoid. Vertical motions of the activation bar essentially in the plane or the parking brake lever are prevented by the slot 366.

Many changes and modifications in the above described embodiment of the invention can, of course, be carried out without departing from the scope thereof. Accordingly, that scope is intended to be limited only by the scope of the appended claims.

We claim:

1. A parking brake system comprising a drum brake (200) comprising two shoes (206) outwardly movable relative to a friction surface of a drum (224);
   - an activation device (220, 222) for generation an activation force to move the shoes outwardly to a first position into contact with the drum sufficiently to prevent the rum from rotating and for removing such force;
   - first means (230, 240; 322, 352) for maintaining the shoes substantially in the first position; wherein the first means includes:
   - a parking brake link (230) attached to and movable with a first one (206b) of the shoes and relatively movable in relation to a second (206a) of the shoes;
   - first engagement means (236) fixed to and movable with the parking brake link (230); and
   - second engagement means (240, 250, 260), attached to the second shoe (206a), movable into engagement with the first engagement means for effecting a connection between the shoes, prohibiting same from substantial movement from the first position; and wherein the first engagement means comprises a first locking formation including a first set of teeth and wherein the second engagement means includes a second set of complementary locking formations including a second set of teeth movable into engagement with the first set of locking formations.

2. The system as defined in claim 1 wherein the second engagement means includes:

second means for moving the second set of teeth into and out of engagement with the first set of teeth wherein the second means comprises:

an engagement link (240, 241) having one end pivotally secured to the second shoe (206b), the engagement link supporting the second set of teeth; and a solenoid (250), responsive to a solenoid control signal, movable between an activated and deactivated condition for moving the engagement link (240) into contact with the first set of teeth.

3. The system as defined in claim 2 wherein the second means includes a spring means (260) for biasing the engagement link away from the first set of teeth.

4. The system as defined in claim 3, wherein after removal of the activation force and the locking of the sets of teeth, the solenoid control signal is removed.

5. The system as defined in claim 2 wherein the solenoid control signal is generated subsequent to the shoes being urged against the drum into the first position, to cause a closure between the first and second sets of teeth, whereupon the activation device is caused to reduce the activation force exerted on the shoes, permitting the shoes to move inwardly generating a small amount of relative motion between the sets of teeth whereupon the teeth move to a locking condition therebetween while maintaining the shoes substantially spaced in the first position to prevent rotation of the drum.

6. The system as defined in claim 5 wherein means are provided for generating a control signal indicative of the teeth locking condition.

7. The system as defined in claim 1 wherein the drum brake (200) includes:

a parking brake lever (300) rotatably mounted to a first of the shoes (206a) and having a first end (308);

a parking brake link (306) joining the parking brake lever (300) to the other of the shoes (206b);

the first end of the parking brake lever being oppositely movable as the shoes are urged apart by the activation device (220); wherein the first means (322, 352) comprises:

an activation bar (322) having first (324) and second ends (326), the first end (324) thereof attached to and movable with the first end (308) of the parking brake lever (300), the second end (326) of the activation bar (322) connected to another portion of the drum brake (200);

first engagement means including a first set of locking formations including a first set of teeth extending perpendicular to a plane in which the parking brake lever moves;

second engagement means (352, 354, 356), attached to a backing plate (202) of the brake drum (200) and movable perpendicular to the activation bar (322) for completing a connection between the backing plate (202), activation bar (322) and parking brake lever (300) so that the shoes are maintained in substantially the first position.

8. The system as defined in claim 7 wherein the second engagement means comprises a solenoid (352) including a member (354) movable into engagement with the first locking formations.

9. The system as defined in claim 8 wherein the member includes a complementary locking formation thereof.

10. The system as defined in claim 1 wherein the activation device (220) comprises a brake cylinder connected to the shoes (206) and wherein the activation force is generated by increasing pressure to the brake cylinder to a level sufficient to lock the drum.

11. A method for achieving a parking brake function within a drum brake (200), the method comprising the steps of:

(a) urging a pair of brake shoes apart into engagement with a brake drum with sufficient force to prohibit the rotation of the drum;

(b) fixing the spacing of the shoes substantially in the position as defined in step (a) such that the drum is prohibited from rotating and wherein the step (a) includes:

(c) increasing pressure to a wheel cylinder attached to the brake shoes and wherein step (b) includes:

moving portions of a shoe spacing mechanism linked to each brake shoe into engagement and e) reducing wheel cylinder pressure to permit the shoes to move slightly inwardly, such inward movement causing a relative motion in the shoe spacing mechanism to achieve a full locking condition.

12. The method as defined in claim 11 including the step of:

f) increasing wheel cylinder pressure causing the shoes to once again move outwardly from the full locking position; such outwardly motion causing the disengagement of the shoe spacing mechanism such that upon reduction of the wheel cylinder pressure the shoes attain their normal driving condition.

13. The method as defined in claim 12 including the step of:

g) generating a signal indicating the full locking condition of the shoe spacing mechanism.

14. The method as defined in claim 13 wherein if the signal is not timely generated, which indicates that the locking of the spacing mechanism did not occur, then the method includes repeating steps (a) through (g).

* * * * *